(12) United States Patent
Koumarianos

(10) Patent No.: US 6,558,691 B1
(45) Date of Patent: *May 6, 2003

(54) FOOD ADDITIVE COMPOSITION

(76) Inventor: Teddy A. Koumarianos, 7306 Laurel Creek Ct., Springfield, VA (US) 22150

( * ) Notice: Subject to any disclaimer, the term of this patent is extended or adjusted under 35 U.S.C. 154(b) by 0 days.

This patent is subject to a terminal disclaimer.

(21) Appl. No.: 10/137,410

(22) Filed: May 3, 2002

Related U.S. Application Data

(63) Continuation-in-part of application No. 10/015,687, filed on Dec. 17, 2001, now Pat. No. 6,488,957.

(51) Int. Cl.$^7$ .......................... A61K 47/00; A61K 9/14; A23L 1/168; A23L 1/20; A23L 1/30
(52) U.S. Cl. .................. 424/439; 424/489; 426/72; 426/73; 426/74; 426/618; 426/629; 426/634; 426/443; 426/519; 426/520; 426/521
(58) Field of Search ................ 424/439, 489; 426/72, 73, 74, 618, 629, 634, 443, 519, 520, 521

(56) References Cited

U.S. PATENT DOCUMENTS

| | | | |
|---|---|---|---|
| 4,348,379 A | | 9/1982 | Kowalsky et al. |
| 4,440,760 A | | 4/1984 | Newnham |
| 4,710,387 A | | 12/1987 | Uiterwaal et al. |
| 5,296,253 A | * | 3/1994 | Lusas et al. ............. 426/629 |
| 5,332,579 A | | 7/1994 | Umbdenstock |
| 5,656,312 A | | 8/1997 | Erasmus et al. |
| 5,770,217 A | | 6/1998 | Kutilek et al. |
| 5,834,048 A | | 11/1998 | Erasmus et al. |
| 5,925,377 A | | 7/1999 | Gerth et al. |
| 5,976,579 A | | 11/1999 | McLean |
| 6,143,332 A | | 11/2000 | McLean |
| 6,238,672 B1 | | 5/2001 | Chen |
| 6,264,995 B1 | | 7/2001 | Newmark et al. |
| 6,274,189 B1 | | 8/2001 | Kazemzadeh |

FOREIGN PATENT DOCUMENTS

| | | |
|---|---|---|
| DE | 3143926 A1 | 5/1983 |
| DE | 4416402 A1 | 11/1995 |
| DE | 19653100 | 7/1998 |
| DE | 19907586 | 8/2000 |
| FR | 2 737 849 A1 | 2/1997 |
| WO | WO 98/00024 | 1/1998 |
| WO | WO 98/47376 | 10/1998 |

* cited by examiner

*Primary Examiner*—Thurman K. Page
*Assistant Examiner*—Simon J. Oh
(74) *Attorney, Agent, or Firm*—Richard C. Litman

(57) ABSTRACT

A food additive composition in a ground particulate composition containing multiple vitamins, calcium citrate, sugar, minerals, herbs, at least 70% to 80% by volume of different types of grains, 10%–20% by volume of beans, berries, and cloves. Two different compositions containing dried (1) vegetables and (2) fruits are formulated, and the nutritious and flavorful additive compositions can be added to food being cooked or while eating out.

13 Claims, No Drawings

FOOD ADDITIVE COMPOSITION

CROSS-REFERENCE TO RELATED APPLICATION

This application is a continuation-in-part of application Ser. No. 10/015,687 filed Dec. 17, 2001, now U.S. Pat. No. 6,488,957.

BACKGROUND OF THE INVENTION

1. Field of the Invention

The present invention relates generally to food supplements. The invention is a food additive, an all-in-one powder composition containing multiple vitamins, calcium citrate, minerals, herbs, beans, peas, grains, flakes, berries, sugar, and spices to add a delightful flavor to any food consumed and curbing one's appetite. More specifically, the invention includes two powdered food additives, namely, (1) Garden Sperbz composition and (2) Fruit Sperbz composition containing all the grains, beans, spices, herbs, vitamins, and calcium mentioned above with the addition of vegetables and fruit, respectively.

2. Description of the Related Art

The related art of interest describes various food supplements, but none discloses the present invention. There is a need for a powdered food additive which supplies a variety of nutrients and flavors for enriching and flavoring one's food, but also curbing one's appetite to prevent overeating. The related art will be discussed in the order of perceived relevance to the present invention.

U.S. Pat. No. 4,710,387 issued on Dec. 1, 1987, to Dirk J. D. Uiterwaal et al. describes a nutritional supplement preparation for pregnant and breast-feeding women based on milk constituents and the process of preparation. The composition contains by weight 10–20% protein, 16–28% fat, 43–65% carbohydrates, at most 3.5% moisture, minerals, trace elements, and vitamins such as calcium, phosphorus, magnesium, copper, zinc, iodine, iron, vitamins A, B1, B6, C, D3, E, niacin, folic acid, and optionally flavoring and/or colorant. The composition is distinguishable for being tailored to supply nutrients to a pregnant or breast-feeding woman and requires large amounts of fat (linoleic acid) and carbohydrates (lactose, dextrins and sucrose).

U.S. Pat. No. 5,770,217 issued on Jun. 23, 1998, to Frank J. Kutilek, III et al. describes a dietary pill supplement comprising herbs, herbal extracts, vitamins, minerals, and amino acids effective in modulating hematological toxicities, enhancing the immune system and maintaining appetite and weight. The supplement contains a large amount of crucifer extract (8–12 wt. %) and ascorbic acid or vitamin C (8–13 wt. %). The amino acids include glutathione, L-cysteine and L-methionine. The composition is distinguishable for requiring crucifer extract and amino acids in pill form.

U.S. Pat. No. 4,348,379 issued on Sep. 7, 1982, to Horst Kowalsky et al. describes a dietetic composition for natural digestion regulation comprising in parts by weight each of 50–150 of whole fleawort seeds, whole linseed, wheat bran, and lactose. A binding agent based on natural rubber and optionally, flavor and/or food color. The composition is distinguishable for requiring fleawort seeds and whole linseed.

U.S. Pat. No. 4,440,760 issued on Apr. 3, 1984, to Rex E. Newnham describes a food supplement for the relief of arthritic conditions comprising in parts by weight of 2–500 of sodium tetraborate, 150 each of the dried herbs Gauaiacum, Berberis and Harpagophytum, 1 ppm Rhus-tox and/or Bryonia, gum arabic as binder, starch as a disintegration aid, and magnesium stearate as a lubricating aid in tablet forming. The composition is distinguishable for requiring sodium tetraborate and several dried herbs not required in the present invention.

U.S. Pat. No. 5,332,579 issued on Jul. 26, 1994, to Anthony J. Umbdenstock describes a nutritional supplement for optimizing cellular health of recovering drug addicts, alcoholics, smokers, etc., comprising: 1,500–15,000 I.U. vitamin A; 5,000–45,000 I.U. Beta-carotene; 33–300 mg. vitamin B1; 50–1,000 mg. vitamin B6; 30–300 mcg. vitamin B12; 20–500 mg. niacin; 100–2,000 mg. niacinamide; 100 mg. vitamin C; 5–100 mg. magnesium; 10–100 mg. zinc; 50–1,000 mg. valerian root; at least two minerals selected from the group consisting of calcium, 20–500 mcg. chromium, copper, iron, 5–1,000 mg. manganese, and selenium; and at least four additional vitamins, herbs, and amino acids selected from the group consisting of 100–1,000 I.U. vitamin D3, 10–800 I.U. vitamin E, 5–100 mg. vitamin B2, 100–1,000 mcg. biotin, 50–500 mg. pantothenic acid, 70–900 mg. choline, 100–1,000 mg. inositol, 50–1,000 mg. glutamic acid, 50–1,000 mg. glutamine, and echinachea. The composition is distinguishable for omitting beans, peas, berries, and grains.

U.S. Pat. No. 5,656,312 issued on Aug. 12, 1997, and U.S. Pat. No. 5,834,048 issued on Nov. 10, 1998, to Udo Erasmus et al. describes a daily dietary food supplement composition packaged in a sealed pouch for humans comprising at least by weight proportions, 71–73% flax seeds, 5% yeast, 6% rice and bran yeast, 2% liver, 2% alfalfa, 1% bone, 2% carrot, 2% apple, 0.07% kelp. 0.01% lecithin, 0.01% garlic, 0.02% taurine, 0.01% equiteum herb, and 0.01% carnitine. The composition must be prepared at a temperature below 100° F. for less than 20 minutes and in the limited illumination of red light. The food composition is distinguishable for requiring liver, yeast, flax seeds, garlic, and taurine as well as limited heating and lighting conditions.

U.S. Pat. No. 5,925,377 issued on Jul. 20, 1999, to Teja D. Gerth et al. describes a dietary supplement composition combining amino acids, minerals, herbs, vitamins, diuretics, and digestive enzymes. For example, D,L-phenylalanine is combined with tyrosine, L-glutamine and St. John's wort to act as an appetite depressant while L-carnitine is combined with chromium picolinate to work as fat directors to convert stored body fat into energy. The composition is distinguishable for requiring diuretics and digestive enzymes.

U.S. Pat. No. 5,976,579 issued on Nov. 2, 1999, and U.S. Pat. No. 6,143,332 issued on Nov. 7, 2000, to Linsey McLean describes a nutritional supplement for the prevention and treatment of excessive intestinal permeability comprising at least 50 wt. % nutritional buffers (calcium carbonate), amino acid chelates (selenium, copper, zinc, manganese, iodine, and chromium), minerals, vitamins (A, B-complex, D, and E), antioxidants, free radical scavengers, and intestinal tract-soothing herbs. The composition is distinguishable for requiring buffers, chelates, antioxidants, and free radical scavengers.

U.S. Pat. No. 6,238,672 B1 issued on May 29, 2001, to Jau-Fei Chen describes dietary supplements containing dehydrated cactus fruit juice and ginseng berry juice for food products, drinks, capsules, and tablets. The supplement is distinguish-able for requiring cactus fruit juice and ginseng berry juice.

U.S. Pat. No. 6,264,995 issued on Jul. 24, 2001, to Thomas Newmark et al. describes a herbal composition for reducing inflammation in bones and joints comprising holy basil, tumeric, ginger, green tea, rosemary, huzhang, Chinese goldthread, barberry, oregano, and *scutellariae baicalensis*. The composition is distinguishable for its medicinal characteristics.

U.S. Pat. No. 6,274,189 B1 issued on Aug. 14, 2001, to Massoud Kazemzadeh describes a reduced-flatulence, legume-based snack foods which comprises saccharides depleted legumes (field bean, white pea bean, Tepary bean, Mung bean, lima bean, Broadbean, chickpea, lentil beans, peanuts, buckwheat, and flax) , grainbased ingredients (cereal grain, oil seed, oil seed flour, and mixtures thereof), water, and processing aids (inorganic and organic compounds of calcium, potassium, sodium, and mixtures thereof) processed with a developed matrix having a high crunch texture and a low fat absorption when cooked. The compositions are distinguishable for requiring cooking.

German Patent Application No. DE 31 43 926 A1 published on May 11, 1983, for Kurt Jesselring et al. describes a dietetic composition containing bran and/or pectin, vitamins, minerals, customary auxiliaries and carriers, and an anti-thrombotically active fraction derived from Basidiomycetes such as Auricularia, *Himeola auricula judae, Polyporus ovinus, Polyporus giganteus,* and *Sparassis crispa*. The composition is distinguishable for requiring an antithrombotically active fraction.

German Patent Application No. DE 44 16 402 A1 published on Nov. 30, 1995, for Harro Carstens et al. describes an immunity improving food additive comprising ethanolic extra extracts of medicinal herbs (aloe), vegetable oils containing eugenol, and, optionally, conventional stabilizers and additives. The medicinal herb extracts have a detoxifying effect through the stomach and intestinal tract. The composition is distinguishable for requiring only herb extracts, vegetable oils and eugenol.

French Patent Application No. 2 737 849 published on Feb. 21, 1997, for Jean P. Curtay et al. describes an orally administered food supplement for adults over forty years of age comprising: (1) an excipient (gum arabic or starch); (2) mineral salts (calcium carbonate, magnesium carbonate, zinc citrate; (3) vitamins B1, B2, B6, B8, B9, B12, C, E, and PP; (4) beta-carotene, (5) borage oil (herb); (6) fish oil; and (7) methionine. The composition is distinguishable for requiring beta-carotene, borage oil and methionine.

German Patent Application No. DE 196 53 100 A1 published on Jul. 23, 1998, for Adolph Metz describes a lactose-containing magnetic capsule food supplement comprising: (1) ferromagnetic magnetite; (2) piezoelectric rock crystal (silica); (3) magnesite powder (magnesium carbonate); (4) ginseng root, taiga root, mistletoe, ginkgo biloba leaves, hawthorn flowers or leaves, horse chestnut leaves, milk thistle, balm mint leaves, St. John's wort, speedwell, linden flowers, arnica flowers, lesser centaury (*Erythraea centaurium*), marigold flowers, yarrow (*Achillea millefolium*), red soapwort, and calamus root; and (5) vitamins A, C, E, aneurin, riboflavin, pyridoxine, B12, and Q10; reduced glutathione, glutamine, cysteine, methionine; (6) Ca-, Mg- and K-citrate; (7) *E. Coli* or *Lactobacillus acidophilus;* (8) heartwood of *Thuaja plicata;* (9) oak bark; (10) aspirin and/or willow bark; (11) zinc, selenium and manganese; and (12) lactose, starch and, dextrose. The composition is distinguish-able for requiring a vast variety of exotic herbs, vitamins, lactose, minerals, and a magnetic constituent.

W.I.P.O. Patent Application No. WO 98/00024 published on Jan. 8, 1998, and W.I.P.O. Patent Application No. WO 98/47376 published on Oct. 29, 1998, for Houn S. Hsia describes a diet supplement composition to increase the level of high density lipoprotein (HDL) and calcium ions, and to decrease the levels of free radicals and glucose in human blood plasma comprising; (1) anti-oxidants selenium, vitamins A, B, C, D, and E, and fruit or vegetable juice concentrates; (2) green barley composition; (3) tincture of ginkgo biloba extract; and (4) minerals. The composition is distinguishable for requiring minerals, ginkgo biloba, and fruit and vegetable juice concentrates.

German Patent Application No. DE 199 07 586 A1 published on Aug. 24, 2000, for Waldemar Braun et al. describes a daily nutritional composition comprising (a) a basic kit for constant circadian dosage combined with (b) an "add-on" supplement used in time-dependent amounts. The basic kit contains specific amounts of various vitamins and minerals including beta-carotene, vitamins B1, B2, B6, B12, niacin, pantothenic acid, biotin, folic acid, phylloquinone, calcium, magnesium, manganese, zinc, iron, selenium, chromium, molybdenum, copper, and iodine. The "add-on" composition contains apple vinegar powder, artichoke extract, carnitine, guarina, silica, creatine, lecithin, and taurine. The compositions are distinguishable for requiring minerals and the "add-on" composition.

None of the above inventions and patents, taken either singularly or in combination, is seen to describe the instant invention of flavoring as claimed. Thus, a food additive composition solving the aforementioned problems is desired.

SUMMARY OF THE INVENTION

The present invention is a food enhancer which curbs one's appetite while simultaneously adding nutritional value and flavor to the food to be eaten. The composition is in powder form that is versatile in application to any food. The food additive can be added to food being cooked, included in appetizers or sprinkled on any food while eating out. It consists of a variety of beans, grains, vitamins, herbs, sugar, and spices. Because the food enhancer is taken in powder form, absorption by the body is maximized and it is easier to swallow as opposed to tablets. This composition is intended to replace salt, pepper and other spices.

Accordingly, it is a principal object of the invention to provide a food supplement to replace salt and other spices in one's diet.

It is another object of the invention to provide a food supplement in powder form.

It is a further object of the invention to provide a food supplement containing beans, grains, vitamins, herbs, sugar, and spices.

Still another object of the invention is to provide a food supplement which can be added to food being cooked or when dining out to add that extra flavor and nutrients.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

DETAILED DESCRIPTION OF THE PREFERRED EMBODIMENTS

The present invention is directed to food supplement compositions containing a wide variety of beans, grains, vitamins, herbs, sugar, and spices in the physical form of a powder mixture: which can be inserted in digestable capsules.

The main compositions are (a) Garden SPERBZ emphasizing vegetables and (b) Fruit SPERBZ emphasizing fruits.

The groups of ingredients will be in terms of (1) beans, (2) grains, (3) multiple vitamins, minerals and calcium, (4) herbs, sugar and spices; (5) vegetables; and (6) fruits.

(1) The beans will include all of the following beans and peas (some with dual names) in equal amounts, such as in teaspoons, for a bean batch: garbanzo bean, soy bean, red kidney bean, pinto bean (mottled kidney bean), black-eyed pea (cowpea), navy bean (white-seeded kidney bean), lima bean, green split pea, lentil seed, Great Northern bean, yellow split pea, garbanzo bean (chick pea), American black bean, and azuki beans (brown, Japanese). Therefore, 12 teaspoons of beans will be added.

(2) The grains include all of the following itemized grains added in equal amounts such as in teaspoons for a grain batch: oat bran, raw buckwheat groat (no hull), buckwheat hull, steel oats, rye flakes, wheat berry, barley wheat bran, whole millet, kamut, whole puinoa, wheat bran, and spelt flakes. Therefore, twelve teaspoons of grains will be added.

(3) This group will contain multiple vitamins, minerals and calcium in terms of vitamin pills containing these ingredients such as: naturally occurring proteins, vitamins (A, B-12, C, D, E, and K), niacin (nicotinic acid), thiamine (vitamin B-1), biotin and pantothenic acid (vitamin B complexes), calcium, iron, iodine, magnesium, phosphorous, zinc, selenium, copper, potassium, molybdenum, manganese, and chromium. The quantities added of each ingredient will be based on the recommended daily dosage.

(4) The herbs, sugar and spices are added in small amounts such as teaspoons each of: sugar, pure oregano, mint, rosemary, basil, anise seed, fennel seed, garlic, sea salt, red pepper, thyme, parsley, clover, nutmeg, cinnamon, and cloves. However, the spices will be adjusted in terms of mild spice composition, medium spice composition, and hot spice composition for each of the following compositions.

(A) The Garden SPERBZ composition is uncooked and contains all listed grains, beans, vitamins, minerals, calcium, herbs, sugar, and spices, and the following vegetables in a combining proportion of approximately 10% to approximately 70% grains, approximately 20% beans, and a minor amount of the remaining ingredients of sugar, vitamins, minerals, calcium, herbs, and spices in volume %. The vegetables are dried and combined in equal volume amounts of spinach, zucchini, kale (hardy cabbage with curled leaves), mustard green, brussel sprout, broccoli, carrot, cauliflower, collard greens (from stalked, smooth-leaved kale), yellow squash, soy bean sprouts, bok choy, and beets with leaves.

(B) The Fruit SPERBZ composition is uncooked and contains all listed grains, beans, vitamins, minerals, calcium, herbs, sugar, and spices, and the following fruits in a combining proportion of approximately 10% to approximately 80% grains, approximately 10% beans, and a minor amount of the remaining ingredients of sugar, vitamins, minerals, calcium, herbs, and spices in volume %. The dried fruits are combined in equal volume amounts of apple, orange, banana, plum, peach, prune, grape, blueberry, and strawberry.

The creation of a Garden or Fruit SPERBZ begins with placing all the listed beans, vegetable pieces or fruit pieces in a hot air spinner machine for at least 15 seconds. The mixtures are ground in a grinder machine until coarse granules are formed. The ground beans, grains, spices, herbs, sugar, and vitamins are mixed to form a uniform mixture which is ground to result in a powdered mixture in a medium spicy taste. For preparing the other levels of spiciness, the total quantities of the spice mixture is adjusted accordingly.

It should be noted that SPERBZ compositions are made in ground form to facilitate its application to food and nutritious absorption by the body, and can be capsuled.

It has been observed that garbanzo beans when added present the best flavor and actually change the taste of the compositions.

It is to be understood that the present invention is not limited to the embodiments described above, but encompasses any and all embodiments within the scope of the following claims.

I claim:

1. A food additive composition comprising:
   at least a dozen different types of beans;
   at least a dozen different types of grains;
   at least twenty different additives selected from the group of vitamins, minerals and calcium citrate;
   at least fifteen different types of herbs and spices; and
   at least a mixture of either 13 dried garden vegetables or 9 dried fruits.

2. The food additive composition according to claim 1, wherein the 13 dried garden vegetables constitute equal volume amounts of spinach, zucchini, kale (hardy cabbage with curled leaves), mustard green, brussel sprout, broccoli, carrot, cauliflower, collard greens (from stalked, smooth-leaved kale), yellow squash, soy bean sprouts, bok choy, and beets with leaves.

3. The food additive composition according to claim 1, wherein the 9 dried fruits constitute equal volume amounts of apple, orange, banana, plum, peach, prune, grape, blueberry, and strawberry.

4. The food additive composition according to claim 1, wherein the dried garden vegetables are added in an amount of approximately 10% by volume.

5. The food additive composition according to claim 1, wherein dried fruits are added in an amount of approximately 10% by volume.

6. The food additive composition according to claim 1, wherein the grains are added in an amount of approximately 70% to 80% by volume.

7. The food additive composition according to claim 1, wherein the grains are oat bran, raw buckwheat groat (no hull), buckwheat hull, steel oats, rye flakes, wheat berry, barley wheat bran, whole millet, kamut, whole puinoa, wheat bran, and spelt flakes.

8. The food additive composition according to claim 1, wherein the twelve grains are added in equal amounts of each type of grain.

9. The food additive composition according to claim 1,; wherein the types of beans are garbanzo beans, red kidney beans, pinto beans, black-eyed peas, navy beans, lima beans, green split peas, lentil peas, Great Northern beans, yellow split peas, black beans, soy beans, and azuki beans.

10. The food additive composition according to claim 1, wherein the beans are in equal amounts of each type of bean.

11. The food additive composition according to claim 1, wherein the composition contains sugar and is in ground form.

12. The food additive composition according to claim 1, wherein the at least twenty different additives selected from the group of vitamins, minerals and calcium citrate are naturally occurring proteins, vitamins A, B-12, C, D, E, and K, niacin, thiamine, biotin, pantothenic acid, calcium, iron, iodine, magnesium, phosphorous, zinc, selenium, copper, potassium, molybdenum, manganese, and chromium.

13. The food additive composition according to claim 1, wherein the herbs, sugar and spices include equal amounts of sugar, pure oregano, mint, rosemary, basil, anise seed, fennel seed, garlic, sea salt, pepper, thyme, parsley, clover, nutmeg, cinnamon, and cloves.

* * * * *